ized Patent [19]

Nolli

[11] 3,739,890
[45] June 19, 1973

[54] POSITIVE SYNCHROMESH GEARS
[75] Inventor: Giovanni Nolli, Brescia, Italy
[73] Assignee: Fiat Societe Per Azioni, an Italian Joint Stocks Company, Turin, Italy
[22] Filed: June 3, 1971
[21] Appl. No.: 149,422

[52] U.S. Cl. .............................. 192/53 E, 192/53 F
[51] Int. Cl. ........................................... F16d 23/06
[58] Field of Search ............... 192/53 B, 53 E, 53 F

[56] References Cited
UNITED STATES PATENTS
2,573,613  10/1951  Schultze ............................ 192/53 F
3,419,120  12/1968  Stott .................................. 192/53 F FOREIGN PATENTS OR APPLICATIONS
1,058,792  11/1953  France .............................. 192/53 F Primary Examiner—Allan D. Hermann
Attorney—Sughrue, Rothwell, Mion Zinn & Macpeak

[57]      ABSTRACT
A positive synchromesh gear device of the free ring type has, in the known way, two synchronizing rings which cooperate with respective frusto-conical coupling surfaces of a driving member and a free member respectively, the latter being rotatable on a driven member and permanently coupled by gearing to the driving member. A number of pins extend axially from each ring towards the other ring and pass through respective bores in a coupling member which is rotatable with but slidable axially on the driven member to connect the driven member selectively either to the driving member for direct drive or to the free member for drive through the gearing. Each pin has inner and outer cylindrical coaxial portions interconnected by a portion tapered towards the free end of the pin, and the pins are normally disposed in a rest position with their outer cylindrical portions within the respective bores of the coupling member. The invention provides a spring-biassed member in each pin, urged into frictional contact with the opposite ring to urge the two rings constantly apart into contact with the respective coupling surfaces, at the same time causing the first ring to tend to draw the second ring along in rotation with it, thereby keeping the outer cylindrical portion of each pin laterally in contact with part of the bore in the coupling member.

3 Claims, 2 Drawing Figures

INVENTOR
GIOVANNI NOLLI

BY Sughrue, Rothwell, Mion, Zinn & Macpeak
ATTORNEYS 3,739,890

POSITIVE SYNCHROMESH GEARS

BACKGROUND OF THE INVENTION

This invention concerns positive synchromesh gears.

The invention is more particularly concerned with positive synchromesh gear devices of the free ring type comprising a first and a second synchronizing ring mounted on frusto-conical coupling surfaces of members which are respectively drivingly connected to a driving member and to a free member freely rotatable relative to a driven member and coupled by transmission means to the driving member, a number of pins extending axially from each ring towards the other ring and each passing through a respective bore in a coupling member rotatable with but slidable axially on the driven member, the coupling member being adapted by axial movement to connect the driven member selectively to the driving member for direct drive therefrom and to the free member for drive through said transmission means, each pin consisting of inner and outer cylindrical coaxial portions interconnected by a frusto-conical surface portion tapered towards the free end of the pin, and the bores of the coupling member being of generally cylindrical form with diameter equal to that of the inner cylindrical portion of the pins and each having, on that side which faces the said inner portion of the respective pin, a frusto-conical countersunk surface, the said pins being normally disposed in a rest position with their outer cylindrical portions within the respective bores.

An object of this invention is to achieve a positive synchromesh gear device of the above type, designed to facilitate movement of the coupling member and in which, immediately preceding any movement of the coupling members the pins of the synchronizing rings are in the correct position for effecting synchronization.

SUMMARY OF THE INVENTION

With this object in view the present invention provides a positive synchromesh gear device of the type previously described, in which each pin is provided with resiliently biassed friction means which are urged into frictional contact with the ring other than that to which the pin is attached to urge the two rings constantly into contact with the respective frusto-conical coupling surfaces and to cause the first ring to tend to draw the second ring into rotation with it so as to keep the outer cylindrical portion of each pin laterally in contact with part of the cylindrical surface of the respective bore in the coupling member.

BRIEF DESCRIPTION OF THE DRAWINGS

The invention will be more clearly understood from the description which follows, by way of non-limiting example, with reference to the accompanying drawings, in which:

FIG. 1, shows diagrammatically a speed-change gear 1 consisting of a driving shaft 2 and a driven shaft 3 placed coaxially and end-to-end.

DETAILED DESCRIPTION OF THE INVENTION

Figure 1:
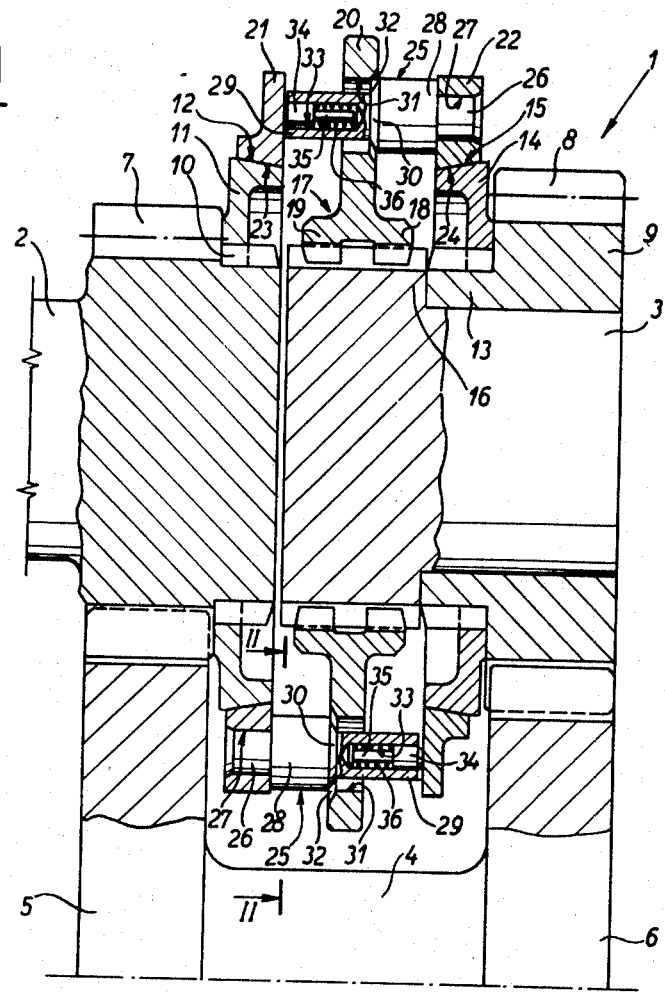
FIG. 1 is a partial axial section of a speed-change gear fitted with a synchromesh device according to one embodiment of the invention.

A lay shaft 4 is positioned parallel to the shafts 2 and 3 and carries integrally, at its two ends, two gears 5 and 6. The gears 5 and 6 are respectively in constant mesh with a cylindrical row of teeth 7 formed integrally with the driving shaft 2 and with a cylindrical row of teeth 8 formed integrally with a free member comprising a bush 9 freely mounted for relative rotation on the driven shaft 3.

The teeth 7 are close to that end of the driving shaft 2 which faces the adjacent end of the driven shaft 3. The driving shaft 2, between the teeth 7 and this end, has an externally splined end portion 10 which is coupled to an internally toothed annular body 11 having a frusto-conical external coupling surface 12 tapered towards the said end of the driving shaft 2.

The bush 9 is mounted on the driven shaft 3 close to the free end of the latter that is, the end facing the adjacent end of the driving shaft 2. The bush 9 has, a tubular coaxial extension 13 which is externally splined and with which an internally toothed annular body 14 is engaged. The annular body 14 is identical with the annular body 11, and has an external frusto-conical coupling surface 15 tapered towards the free end of the driven shaft 3.

The driven shaft 3 has a splined end portion 16 projecting beyond the bush 9 and having an outer diameter equal to that of the tubular extension 13 of the bush 9 and that of the splined end portion 10 of the driving shaft 2. The splined end portion 16 of the driven shaft 3, is moreover, separated from the splined end portion 10 of the driving shaft 2 by a small gap.

An internally toothed sleeve 17 is mounted for axial sliding movement on the splined end portion 16 of the driven shaft 3. The sleeve 17 comprises two interconnected coaxial rings 18, 19, both internally splined, joined to each other by an outer annular flange 20 disposed in a radial plane perpendicular to the common axis of the shafts 2 and 3.

First and second synchronizing rings 21 and 22 are freely rotatably mounted on the annular bodies 11 and 12 respectively, the rings 21 and 22 having respective internal frusto-conical surfaces 23 and 24 which are complementary to and cooperate respectively with the frusto-conical surfaces 12 and 15 of the annular bodies 11 and 14.

Each of the two rings 21 and 22 is provided with a number of axially extending pins 25, extending towards the other ring and uniformly distributed around each ring. Each of the pins 25 has a cylindrical portion 26 which fits within a respective hole 27 in the respective ring 21 and 22 which is anchored therein. The stem of the pin 25 projecting beyond the respective hole 27 is formed with inner and outer coaxial cylindrical portions 28 and 29 interconnected by a frusto-conical surface portion 30, the outer cylindrical portion 29, disposed at the free end of the pin 25, having a smaller diameter than the inner cylindrical portion 28. The free end of the cylindrical outer portion 29 of each pin 25 is spaced from the adjacent flat face of the adjoining ring 21 or 22 by a very small distance.

Each pin 25 extends through a bore 31 made in the flange 20 of the sleeve 17. Each bore 31 is generally cylindrical in shape, its diameter being equal to that of the cylindrical inner portion 28 of the respective pin 25. At its end which faces towards the inner portion 28 of the respective pin 25, each bore 31 is formed with a frusto-conical countersunk surface 32 which is complementary to the frusto-conical surface portion 30 of the pin 25.

The cylindrical outer portion 29 of each pin 25 has an internal cylindrical axial blind bore 33 which is open at the free end of the said portion body 29. A small cylindrical piston 34 is mounted for sliding movement in each bore 33. The piston 34 is connected to a rod 35 which extends axially into the bore 33 towards the blind end of the latter. A helical spring 36 is assembled coaxially on the rod 35 and is compressed between the bottom of the bore 33 and the said piston 34, biassing the piston 34 outwards into contact with the adjacent flat end surface of the ring 21, or 22 which faces the free end of the respective pin 35.

OPERATION

When it is desired to establish direct drive transmission between the driving and driven shafts 2 and 3 the toothed sleeve 17 is moved to the left of FIG. 1.

Prior to such movement both the rings 18 and 19 of the sleeve 17 are keyed on to the splined end portion 16 of the driven shaft 3. The two rings 21 and 22 are urged apart by the springs 36, so that their internal frusto-conical surfaces 23 and 24 cooperate with the external frusto-conical surfaces 12 and 15 respectively of the annular bodies 11 and 14, but with a frictional force insufficient to cause rotation of the ring 21.

Figure 2:
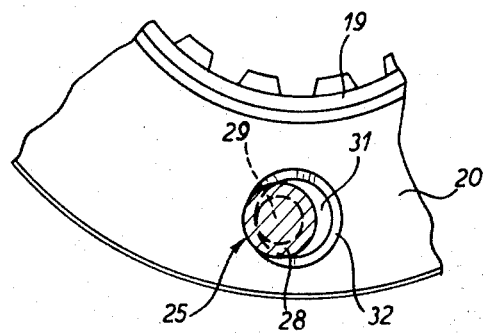
FIG. 2 is a cross section taken along line II—II of FIG. 1.

Moreover, under the action of the springs 36 the pistons 34 are held in contact with the facing surfaces of the rings 21 and 22 so that the ring 21 tends to carry the ring 22 in rotation with it due to frictional forces between the rings 21, 22 and the pistons 34. Consequently, part of the lateral surface of each of the outer cylindrical portions 29 of the pins 25 is brought into contact with the lateral surface of the respective bore 31 in the flange 20, as illustrated in FIG. 2.

Upon leftward movement of the toothed sleeve 17, therefore, the cooperating lateral surfaces of the frusto-conical surface portions 30 of those pins 25 attached to the ring 21 and the frusto-conical countersunk surfaces 32 of the respective bores 31 ride over each other, centralizing the pins 25 in the bores 31 and applying progressively increasing the axial loading to the ring 21. The increasing axial loading of the ring 21 causes the frictional force between the frusto-conical surfaces 23 and 12 of the ring 21 and the annular body 11 to increase progressively until rotation is transmitted from the driving shaft 2, through the annular body 11, the ring 21 and the pins 25 attached to the ring 21, to the toothed sleeve 17. The speed of rotation of the toothed sleeve 17 increases as the latter moves progressively leftwards until the sleeve 17 is rotating at the same speed as the driving shaft 2.

When the speed of the sleeve 17 is equal to that of the driving shaft 2 the toothed sleeve 17 is given a further slight movement leftwards relative to the driving shaft 2, causing the internally splined ring 19 to engage the externally splined end portion 10 of the driving shaft 2, while at the same time the cylindrical inner portions 28 of the pins 25 attached to the ring 21 enter the respective bores 31 of the flange 20 of the toothed sleeve 17. The splined rings 19, 18 of the sleeve 17 then mesh with the splines with the end portions 10 and 16 of the respective shafts 2 and 3, transmitting drive directly from the driving shaft 2 to the driven shaft 3.

When it is desired to interconnect the bush 9 and the driven shaft 3 in order to transmit drive from the driving shaft 2 to the driven shaft 3 via the gears 5 and 6 of the lay shaft 4, the sleeve 17 is moved towards the right of FIG. 1, when, by a sequence of movements analogous to that previously described, the ring 22 is caused to rotate until its speed is equal to that of the bush 9, prior to engagement of the internally splined ring 18 of the sleeve 17 with the splined extension 13 of the collar 9.

The provision of the spring-loaded pistons 34 within the pins 25 ensures that immediately prior to any movement of the toothed sleeve 17 the pins 25 are in the correct position to effect synchronization of the rotating parts to be interengaged.

It will be appreciated that details of specific embodiments of the invention may be widely varied from what has been illustrated and described purely by way of example, without nevertheless going beyond the scope of the invention.

I claim:

1. In a speed change gear having a driving member, a driven member, a free member freely rotatably mounted on the driven member, and transmission means coupling the free member to the driving member, a positive synchromesh gear device of the free ring type comprising:
    i. respective members having frusto-conical coupling surfaces and having means drivingly connecting said members to the driving member and the free member respectively;
    ii. first and second synchronizing rings mounted on the frusto-conical coupling surfaces of said respective members;
    iii. a coupling member mounted on the driven member and coupled to the latter for rotation therewith, said coupling member being slidable axially on the driven member, and having a plurality of through bores;
    iv. a plurality of pins extending axially from each respective ring towards the other ring, said pins passing through respective said bore in the coupling member;
    v. selector means for moving the coupling member axially to connect the driven member selectively to the driving member for direct drive therefrom and to the free member for drive through said transmission means;
    vi. inner and outer cylindrical coaxial portions on each respective pin, and a respective frusto-conical surface portion, tapering towards the free end of the pin, interconnecting said cylindrical portions, each said bore being generally cylindrical with a diameter substantially equal to that of the inner cylindrical portion of the respective pin, and each bore having, on that side which faces the inner portion of the respective pin, a frusto-conical countersunk surface, said pins being normally disposed in a rest position with their outer cylindrical portions within the respective bores, wherein the improvement consists in that:
    vii. said outer cylindrical portion of each pin is provided with a coaxial cylindrical cavity, said cavity being open at the free end of the respective pin, and housing resiliently biased friction means urged into frictional contact with the ring other than that to which said pin is attached, urging said two rings constantly into contact with said respective frusto-conical coupling surfaces, and causing said first ring to tend to draw said second ring into rotation, keeping the outer cylindrical portion of each said pin laterally in contact with part of the cylindrical surface of the respective bore in said coupling member.

2. Synchromesh gear device as defined in claim 1, wherein each said resiliently biassed friction means comprise, within the respective pin, a cylindrical piston slidably housed in said cylindrical cavity, each said elastic biassing means in said cavity biassing said piston to project partially from the respective cavity and causing said piston to bear against an adjacent surface of the ring which faces the free end of the said pin.

3. Synchromesh gear device as defined in claim 2, wherein said elastic biassing means comprise, within each pin a helical spring located within the respective cylindrical cavity and compressed between the bottom of the latter and the respective piston and a rod extending from said piston axially within said spring.

* * * * *